(12) United States Patent
Kling et al.

(10) Patent No.: US 6,364,494 B1
(45) Date of Patent: Apr. 2, 2002

(54) REMOTELY ADJUSTABLE ANTI-GLARE VEHICLE MIRROR SYSTEM WITH AUTOMATIC FEATURES

(75) Inventors: Carl C. Kling, Cos Cob, CT (US); Kanti Jain, Briarcliff Manor, NY (US)

(73) Assignee: Anvik Corporation, Hawthorne, NY (US)

( * ) Notice: Subject to any disclaimer, the term of this patent is extended or adjusted under 35 U.S.C. 154(b) by 0 days.

(21) Appl. No.: 09/404,636

(22) Filed: Sep. 23, 1999

Related U.S. Application Data

(62) Division of application No. 08/932,687, filed on Sep. 18, 1997, now Pat. No. 5,969,870.

(51) Int. Cl.[7] .............................................. G02B 27/00
(52) U.S. Cl. ........................ 359/601; 359/602; 359/603; 359/604; 359/606
(58) Field of Search ................................. 359/601, 602, 359/603, 604, 843, 872, 877, 606, 874, 875

(56) References Cited

U.S. PATENT DOCUMENTS

| | | | |
|---|---|---|---|
| 4,886,960 A | * 12/1989 | Molyneux | 250/209 |
| 5,148,014 A | * 9/1992 | Lynam et al. | 250/250 AL |
| 5,450,246 A | * 9/1995 | Jain | 359/877 |
| 5,532,876 A | * 7/1996 | Gauer et al. | 359/604 |
| 5,691,848 A | * 11/1997 | Van Lente et al. | 359/601 |

* cited by examiner

Primary Examiner—Mohammad Sikder
(74) Attorney, Agent, or Firm—Carl C. Kling

(57) ABSTRACT

This single-actuator-and-cam, remotely adjustable, exterior vehicle rear-view mirror provides a glare-free rear view, by switching between a high-reflectivity position and a low-reflectivity position at the same view adjustment. Exterior rear-view mirrors are repositioned by a single motor and rotary cam scanning all possible mirror positions. The single-motor mechanism increases reliability while accomplishing both directional alignment and day/night reflectivity selection, using a cam with positions for all predicted view positions, two reflectivity positions for each view. This invention works equally well with flat wedge mirrors and wide-angle convex wedge mirrors. Since each position is unique, each directional/reflectivity position is assigned a set of digital coordinates which can be stored for each vehicle driver and each glare condition, for an initial setting which can be easily, or even automatically, adjusted for changes as the driver desires. Customizing features include manual and vehicle driver identification, controlled override, start-up reset, and glare threshold setting.

3 Claims, 8 Drawing Sheets

REMOTELY ADJUSTABLE ANTI-GLARE VEHICLE MIRROR SYSTEM WITH AUTOMATIC FEATURES

CROSS-REFERENCE TO RELATED APPLICATION

This patent application is a Division of U.S. Pat. No. 5,969,870 issued Oct. 19, 1999 REMOTELY ADJUSTABLE, ANTI-GLARE VEHICLE MIRROR SYSTEM CONSTRUCTION, Jain et al. (Application Ser. No. 08/932,687, filed Sep. 18, 1997).

STATEMENT REGARDING FEDERALLY SPONSORED RESEARCH OR DEVELOPMENT

This invention was not made pursuant to any federally sponsored research or development.

REFERENCE TO A "MICROFICHE APPENDIX."

There is no "Microfiche appendix."

BACKGROUND OF THE INVENTION (1) Field of the Invention

This invention relates to vehicle mirrors, and more particularly relates to an integrated, simplified system of vehicle mirrors, each having driver-operated adjustments of a single motor for remote, multi-axis directional alignment as well as for remote glare reduction without change of directional alignment.

(2) Description of Related Art

In numerous situations for drivers of vehicles, the reduction of glare due to reflections of incoming light from various sources is an important safety consideration. The internal rear-view mirror in most vehicles has a dual position feature for day/night setting. The glare is caused by light entering the vehicle from the rear, being reflected from one or more mirrors provided for viewing the rear scene, and then entering the driver's eyes. Such glare causes eye discomfort to the driver, makes it difficult for him to ascertain the overall driving scene, and thus creates a potentially hazardous driving environment. Most frequently, the undesirable glare results from headlights of other vehicles that are behind the viewing driver, particularly if the headlights of the following vehicle are set at "high-beam." On other occasions, light from the sun may cause the unwanted glare, particularly soon after sunrise or before sunset when the sun's rays are nearly horizontal.

The human eye readily adapts to bright lights during the daytime. The iris constricts and the light intensity is attenuated. In the daytime, the constricted iris allows only a tiny amount of light through the pupil, and minor changes of light intensity are not noticeable. At night the iris opens to allow the maximum amount of light into the eye through the enlarged pupil, and consequently, the eye is extremely sensitive to bright lights. Besides causing discomfort to the driver, another vehicle's high beam lights reflected in a rear-view mirror can cause momentary blindness as the eye adjusts to the bright light.

It is desirable that the rear view be presented to the driver continuously in at least two mirrors, and preferably in three mirrors. However, many drivers, in order to prevent unwanted glare from blinding them, rely solely upon the inside mirror (which has glare-reduction capability), and do not use the side mirrors (which do not have glare reduction capability), thereby handicapping visibility. In a typical situation, light beams from the headlights of vehicles behind the driver enter his eyes after reflections from a rear-view mirror mounted inside his vehicle near the top-center of the front windshield, from a left-side rear-view mirror mounted outside the vehicle, and frequently also from a right-side rear-view mirror. For directional alignment, the inside-mounted mirror is adjusted manually, and in modern vehicles has a day/night feature. For directional alignment of the externally mounted mirrors, most vehicles provide remotely operated adjustment mechanisms mounted inside the vehicle. Whether these mirrors are adjusted by remote control or by hand the driver will usually adjust the directional setting to obtain the best rear-view. The driver is forced to accept the glaring reflections from the left-side and right-side rear-view mirrors, since such mirrors do not have a day/night feature.

Currently no vehicle provides a left- (or right-) side rear-view mirror with a driver-controlled remote day/night reflectivity-adjustment feature. One luxury automobile offers a chemical glare-reduction feature similar to automatic sunglasses, but this is expensive and too slow-acting to eliminate momentary glare effectively during night driving. Further, it lacks the critically important manual override control for the driver. There is an important need to develop and provide convenient, safe, and economical mirrors for automobiles that reduce glare from all reflections. K. Jain, one of the named inventors, has provided such human factors in side mirrors having a remote high/low reflectivity adjustment, as well as a remote directional alignment mechanism, in U.S. Pat. No. 5,450,246, issued Sep. 12, 1995.

Mirrors that provide two different reflectivities are commonly used in road vehicles. Such mirrors operate on the same basic principle: they all use a wedge mirror to control the number and strength of reflections as a function of the angular position of the mirror. The reflectivity-adjustment feature for the inside-mounted rear-view mirror typically employs a wedge mirror, silvered on one side. The mirror is mounted so that its unsilvered side first receives the incident light beam. The high/low reflectivity adjustment consists of a mechanical lever that turns the wedge mirror by an appropriate angle (approximately 4°) so that the incident beam travels either a short single-reflection path through the glass or a longer triple-reflection path through the glass to the driver's eyes. The turning angle is such that, in the single-reflection position, light traveling to the mirror enters the wedged glass plate, is reflected by the silvered rear surface, exits the glass plate, and reaches the driver's eyes; whereas in the triple-reflection position, the beam reflected from the rear-surface is reflected partially back from the front surface of the glass plate back to the rear surface, where it is again reflected, a second time, from the rear surface. The light, thrice reflected, exits the glass plate, and reaches the driver's eyes greatly diminished in intensity as a result of the much lower reflectivity of the unsilvered surface.

The functionality of the right-side exterior mirror is slightly different from the left-side exterior mirror. The left-side mirror is a flat mirror and provides unit magnification, as required by federal vehicle safety standards. In contrast, in a majority of automobiles, the right-side exterior rear-view mirror is a convex mirror. A convex mirror is provided to increase the angular field of view (albeit by less than 1:1 magnification, which makes following vehicles appear farther away than they are). Although increasing the view field of the driver, such a convex mirror, like the flat left-side mirror, reflects other drivers' headlights into the driver's eyes at night without attenuating the intensity of the beam, producing a hazardous glare situation.

Thus, the problem of bright lights in the side view mirrors requires, as a solution, a day/night reflectivity control, for both left and right mirrors, which does not alter the view adjustment and is convenient, safe, and economical.

In the cited prior-art patent by one of the co-inventors, control of each outside mirror involves four motors—three for angular view adjustment and one for day/night reflectivity toggling. A second configuration of the prior art replaces the fourth motor with a solenoid. Also described is mirror control using three motors—in which the day/night motor (or solenoid) is eliminated, and the fixed shift for day/night change is accomplished by moving the three view angle adjustment motors suitably. Also previously described is a mirror system having only two motors—this is accomplished by having one of the above three motors replaced by a ball-and-socket pivot, and programming the two motors to provide the appropriate angular shifts in two orthogonal dimensions.

The above-referenced prior art U.S. Pat. No. 5,450,246, by K. Jain, describes a remote controlled, anti-glare vehicle mirror with excellent human factors, but does not provide an optimized minimal mechanical/electronic control system. The present invention discloses a complete remotely adjustable anti-glare vehicle mirror system including an integrated, user-friendly, minimal mechanical support and control system for each exterior mirror.

BRIEF SUMMARY OF THE INVENTION

The invention provides an automobile mirror control system including optimized, integrated control systems for left-side and right-side rear-view mirrors with viewer-controlled adjustments for glare reduction as well as remote multi-axis directional alignment, using only one motor per mirror.

The object of the invention is to provide a rear-view mirror having elegantly simple, integrated, remotely operated control means for the adjustment of the reflectivity of the mirror as well as its directional alignment customized for different specific drivers.

A feature of the invention is a computer controlled rotary cam which drives the mirror through its entire range of view positions for both day and night anti-glare positions.

Another feature of the invention is a cam mechanism which is driven by a single motor through a complete range of view positions.

A feature of the invention is the provision of a convex portion in the mirror which serves as a socket for supporting the mirror and also serves as a wide-angle mirror.

A related feature uses a single motor and glare-control cam for a complete range of view positions with day/night reflectivity selectability at each view position.

Another feature is the placement of position marks on the rotary cam-driver, to provide for individualized view positioning as well as glare repositioning.

An advantage of the invention is its ability to provide glare-free views of the rear scene for a driver in all rear-view mirrors operated by an integrated control system having a single motor for each remotely-adjustable mirror.

Another advantage of the invention is its ability to provide adjustments for both glare reduction and directional alignment, customized for different drivers, by one remotely operated control system.

Other objects, features, and advantages of the invention will be apparent from the following specification and from the annexed drawings and claims.

DETAILED DESCRIPTION OF THE INVENTION

First Embodiment

Figure 1:
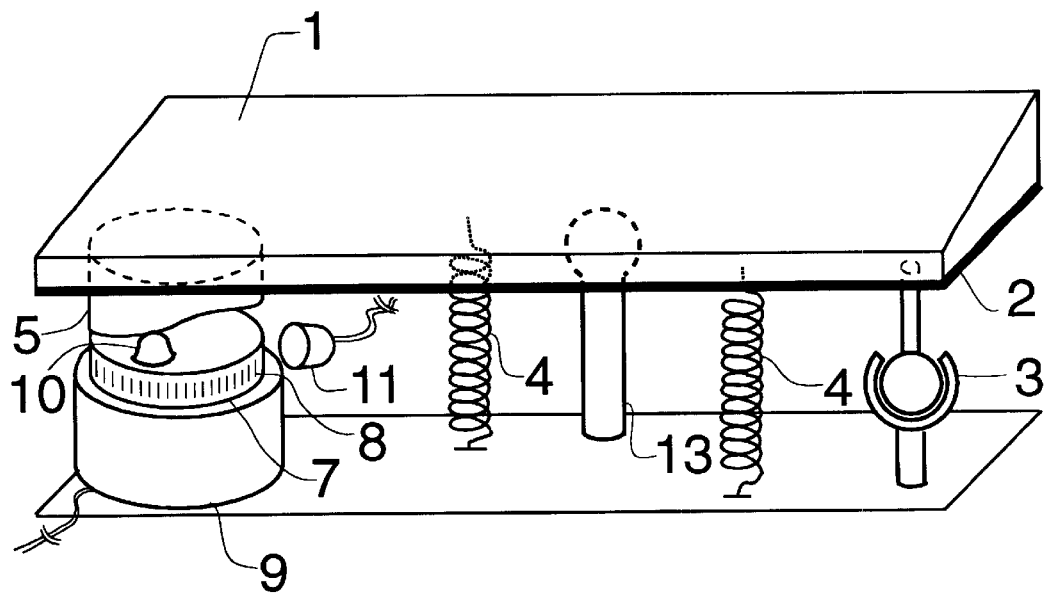
FIG. 1 presents a view of the multifunctional mirror assembly using a cam and a single motor, illustrating details of the adjustment mechanism for directional alignment and reflectivity selection.
Figure 2:
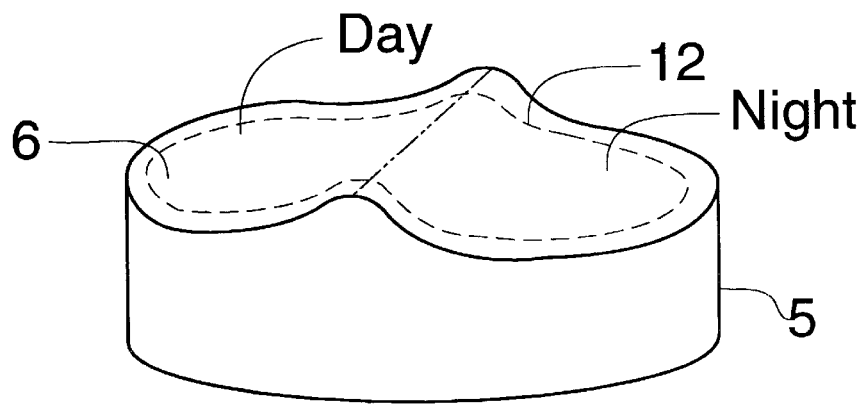
FIG. 2 shows the detail of the path traversed by the adjustment mechanism on the view selection cam. [Note that the cam configuration shown is schematic and is not shown to scale.]

FIG. 1 shows a single-motor-and-cam mechanism to drive a rear-view mirror through its complete repertoire of view adjustment positions as well as its complete range of anti-glare positions. Wedge mirror 1, with 2 as its silvered side, is carried by a ball-and-socket pivot 3, which is situated near one end of the mirror. At the diagonally opposite corner is affixed a view/reflectivity selection cam 5. The complete repertoire of angular adjustments of the mirror is controlled by a motor 9 as follows: the motor 9 turns in response to a signal received from the vehicle driver. As the motor 9 turns, a cam-driver contact 10, attached to the rotary cam-driver 7 which rotates with the shaft of the motor 9, traverses the surface 6 of the cam 5, the locus of the point of contact being an ellipse 12 as shown in FIG. 2. A suitable set of springs, or other positive loading mechanism 4, ensures that the cam driver contact 10 is always in contact with the surface 6 of the cam 5.

The cam surface 6 is designed such that the required range of view-angles is provided by a full or partial turn of the cam driver 7. Thus, for each position of the motor (i.e., each position of the cam driver contact 10), there is a related angular position of the mirror.

FIG. 2 schematically shows a cam surface 6 designed so that all required view angles are provided by traversal of cam driver contact 10 along half (or less) of the ellipse 12; and, the traversal along the other half of the ellipse is such that a fixed day/night angle adjustment is made to the view angle. The cam surface may be designed such that the various day/night view angle adjustments are interspersed with each other, and not separated on different parts of the cam, since in many situations a day view position for one vehicle driver may be identical to a night view position for a different driver.

The side of the rotary cam-driver 7 may have bar-code type markings 8 that can be read with a digital reader 11 to determine the exact mirror position. The rotary cam-driver 7 may also be positioned using an angular sensor. The rotary cam-driver 7 can be cast of plastic or any suitable material with an appropriate shaft socket, and as appropriate with gear teeth on its internal side surface.

Figure 3:
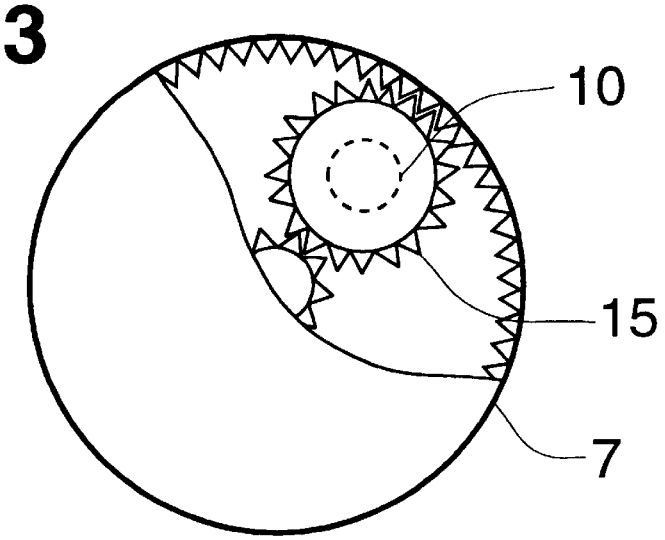
FIG. 3 shows the drive configuration utilizing a reducing gear configuration to drive the rotary cam-driver of the motor assembly.

FIG. 3 shows a preferred detail of the first embodiment, with reduction gearing to permit most effective use of the characteristic speed and torque of the single motor. While a single-direction motor will perform adequately, a dual-direction motor is preferred because it eases the view adjustment process. The rotary cam-driver 7 is shown being driven by a reducing gear 15. The internal gear teeth of rotary cam-driver 7 can be molded along with the cam driver contact 10 and locator marks 8. The gear 15 can be attached to the rotary cam-driver 7 at the point of contact of the cam driver contact 10 with the cam 5.

Since all the angles (including the day/night alternates) can be predefined and programmed into the motor positions according to cam characteristics, full functionality of the mirror can be obtained by one motor and its related cam mechanism. The elevation and view adjustments are made in unison during a complete or partial rotation of the cam driver 7. The various settings for day/night adjustment can be stored in a look-up table in the car's microcontroller. Various settings can be stored utilizing bar-code markings 8, as well as the day/night adjustment position. Note that different cams may be required for the left and right-side mirrors due to their different viewing angles.

A variation to be considered when the mirror is large or when space is limited is to use a cylindrical cam mounted axially on the motor shaft parallel to the back of the mirror, without any reduction gearing.

Figure 4:
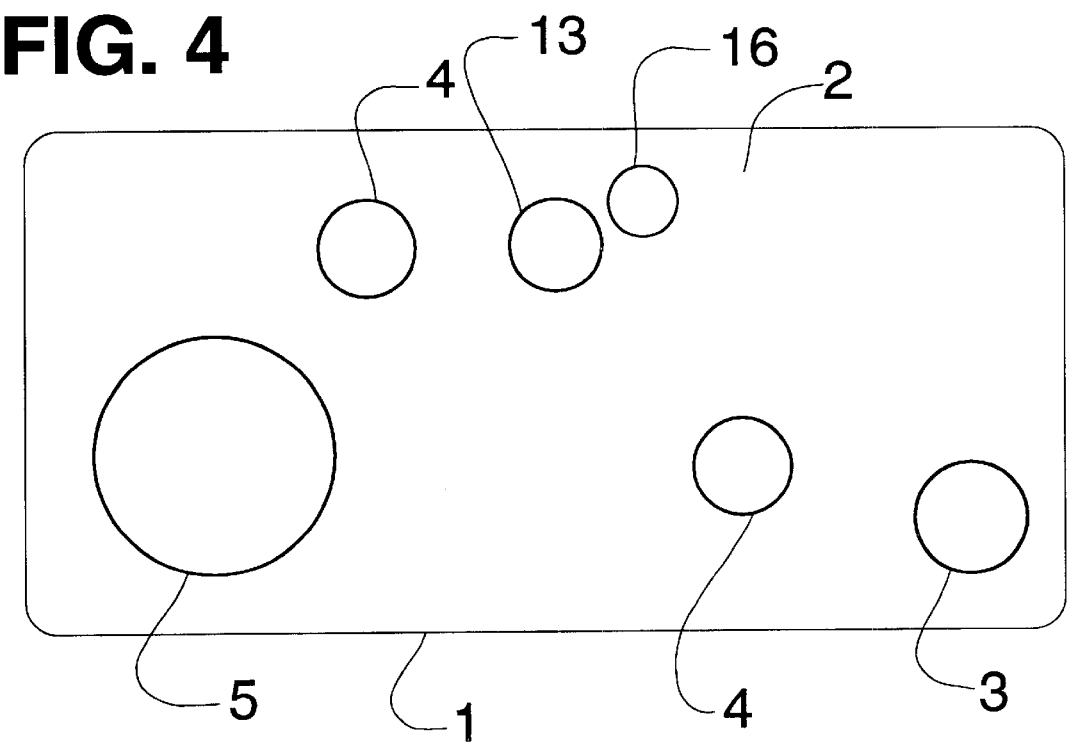
FIG. 4 presents a view of the back side of the mirror to demonstrate component placement to achieve directional and alignment adjustment using a single motor.

FIG. 4 presents a variation of the first embodiment of the invention. The view/reflectivity cam 5, ball pivot 3, stop 13, and loading means 4 are arranged as they were in the first embodiment. The day/night actuation is accomplished by the solenoid 16, which is capable of moving the mirror 1 approximately by four degrees, thereby attenuating the reflection but leaving the view adjustment unchanged.

Second Embodiment

Figure 5:
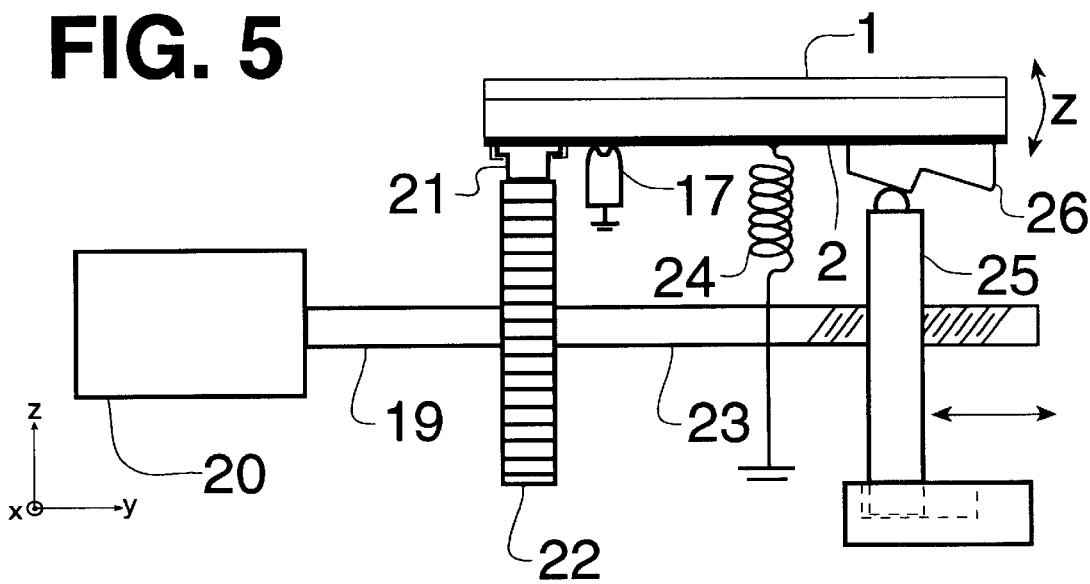
FIG. 5 presents a second embodiment of the invention where directional alignment and reflectivity selection is accomplished using a sliding, ramped rack and pinion gear and a ball and post assembly which rides on a wedge cam to manipulate the wedge mirror.
Figure 6:
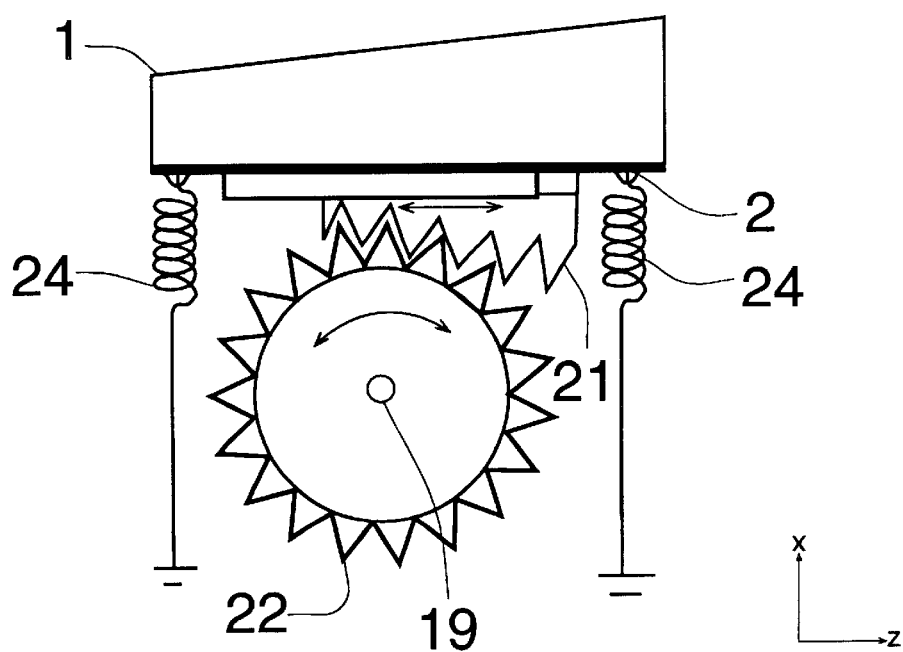
FIG. 6 shows a detail of a ramped rack and pinion gear adjustment mechanism and the wedge mirror.
Figure 7:
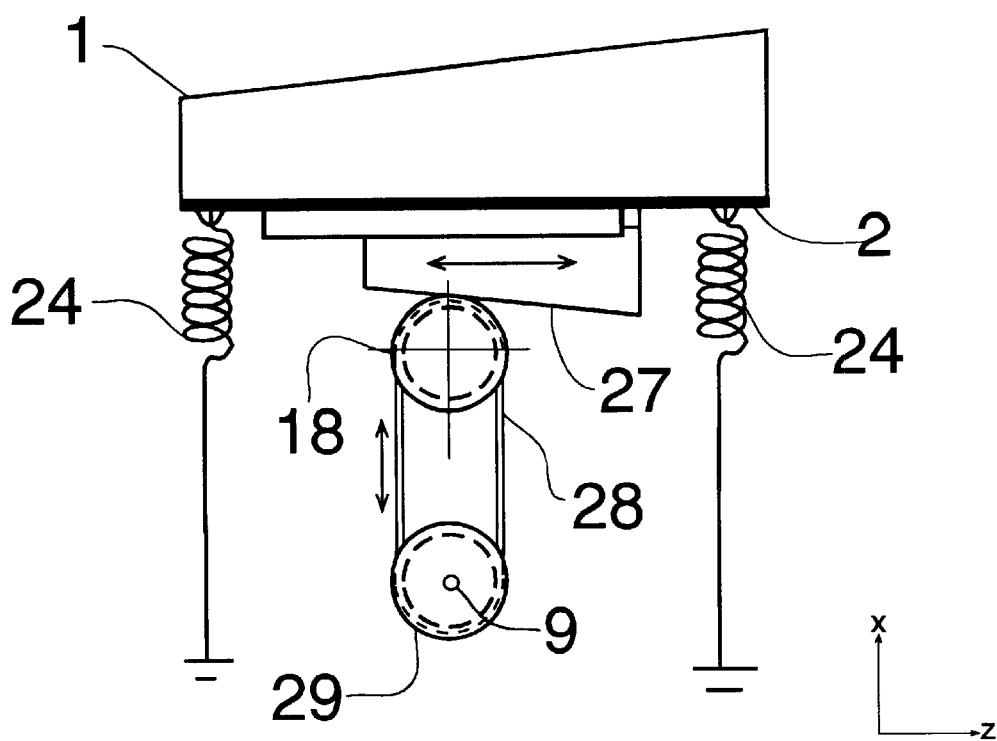
FIG. 7 shows a detail of a belt and pulley adjustment mechanism to provide rotation about the y-axis and the wedge mirror.

FIGS. 5 through 7 show an alternative configuration that also requires only one motor to control the angular adjustment in two directions. In FIG. 5, as the reducing motor 20 turns, the screw thread 23 moves the post-ball assembly 25 along the y-axis sufficiently to traverse one half of ramp cam 26. This displacement in y causes the post-ball assembly 25 to slide along the ramp cam 26 and tilt the mirror 1 along the z-axis (about the x-axis to adjust the view of the mirror) shown by the double arrow. The overall motion of the mirror is partially limited by the stop 17. The other angular adjustment (orthogonal to the first one to adjust the elevation of the mirror) is accomplished by means of a rack 21 and pinion 22, shown in detail in FIG. 6. The pinion 22 is attached to the shaft 19 of the reducing motor 20 such that both turn at the same rate (i.e. they behave as a rigid body). The pinion 22 engages the wedged rack 21 so that the rack slides on the back of the wedge mirror in a track, changing the angle about the y-axis. When the driver toggles the mirror from the day to night setting, the reducing motor is triggered to turn and the pinion 22 moves the wedged rack 21 to a position that changes the orientation of the mirror by the appropriate angle, usually four degrees, to the attenuated position. The pinion gear 22 may be curved where it engages the rack to insure proper contact as the mirror changes position. A compressible gasket material between the pinion 22 and the rack 21 may also be used to insure proper contact between the rack and pinion as the mirror changes position. The motion of the reducing motor 20 also causes the post-ball assembly to progress further along the ramp cam 26. The ramp cam is designed such that the view adjustments are duplicated on the ramp enabling the post-ball assembly to move to a corresponding position on the ramp cam, leaving the driver's view unchanged, while the wedged rack repositions the mirror to the attenuated position. Similarly, the wedged rack is designed to maintain the view adjustment after moving to the night position.

FIG. 7 is a variation of this embodiment using a belt and pulleys to replace the gears of FIGS. 5 and 6. A pulley can be attached to the shaft 19 and equipped with a belt to drive a second pulley 18. The pulley 18 drives a wedge 27 along the back of the mirror 2 in a track, similar to the manner that pinion gear 22 drives the wedged rack 21 to pivot the mirror about the y-axis.

Figure 8:
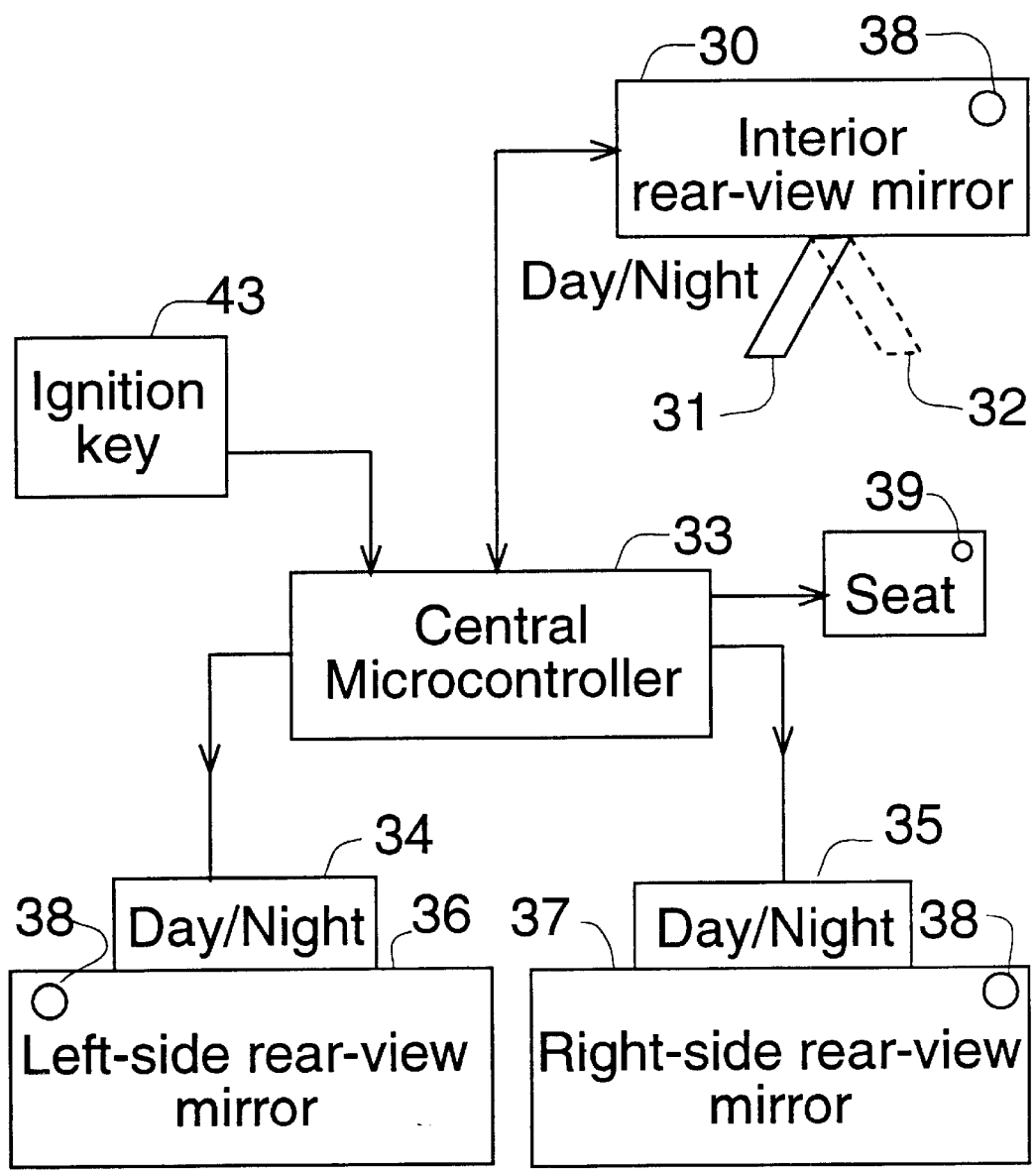
FIG. 8 presents the system for automatically adjusting the exterior rear-view mirrors controlled by adjusting the interior rear-view mirror, as well as for implementing driver-personalized prepositioning and other positioning and day/night features.

FIG. 8 shows the control path for synchronizing the adjustment of the exterior mirror for high reflectivity and low reflectivity, made automatic and synchronized with the day/night adjustment for the interior mirror. When the driver changes the setting of the interior mirror 30 to either day or night, an electrical signal is sent to a central microcontroller 33, which is a microprocessor, programmable logic chip (), or set of relays on the dashboard or other convenient place, and may be the main electronic control panel for the vehicle. This microcontroller 33 sends signals to the left-side and right-side mirrors, instructing them to tilt by the appropriate angle, thereby bringing these mirrors to the day or night positions, as needed. If there are several different drivers for a particular vehicle, each driver can store his/her unique interior mirror and side-view mirror position settings in the microcontroller 33. This allows a vehicle driver to recall his/her unique mirror settings every time the vehicle is driven. Precise mirror control is accomplished using digital feedback from the mirror to the microcontroller so the exact mirror location is always known. We add a reset feature that resets the mirrors to the day position whenever the vehicle is shut off and restarted.

A variation of the individual vehicle driver recall is for each vehicle driver to establish an individual glare threshold and set that glare threshold into the vehicle microcontroller. A set of sensors 38 mounted on an outside mirror provide light intensity readings for forward-view, ambient light, and rear-view, and send these readings to the microcontroller. The microcontroller compares these readings to the glare threshold set by the individual vehicle driver and automatically toggles the mirrors from day to night if the threshold limit is exceeded. We also add a manual override to disable the automatic day/night toggle feature or to individually toggle any one of the rear-view mirrors without affecting the other mirrors. We can also customize each driver's ignition key 43 such that when a driver inserts his/her key into the ignition, a signal is sent to the central microcontroller 33, which recognizes the key, and sends the appropriate adjustment signals to the mirrors 30, 36, 37 and also to the drivers seat 39, thus automatically adjusting all of them optimally for that driver.

Figure 9:
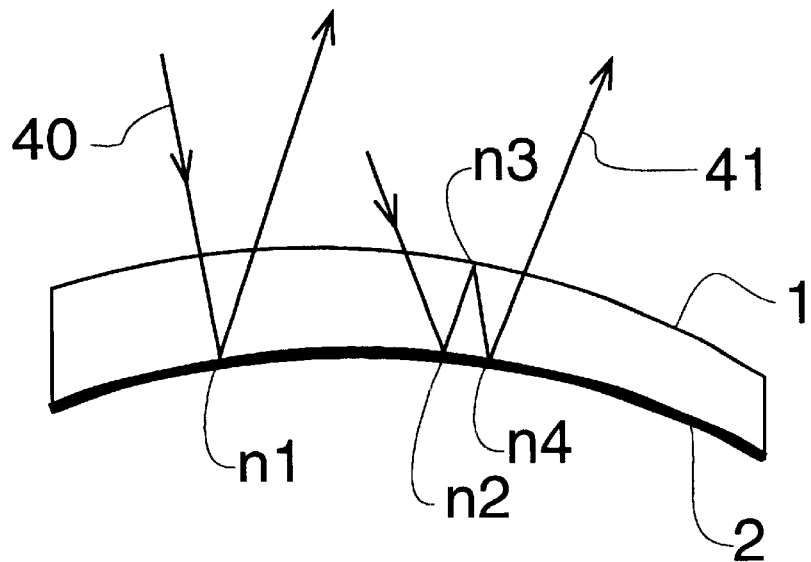
FIG. 9 illustrates a wedge convex mirror and shows the light ray paths in the day/night reflectivity positions respectively having one reflection and three reflections, and respectively having two and four passes through the glass.
Figure 10:
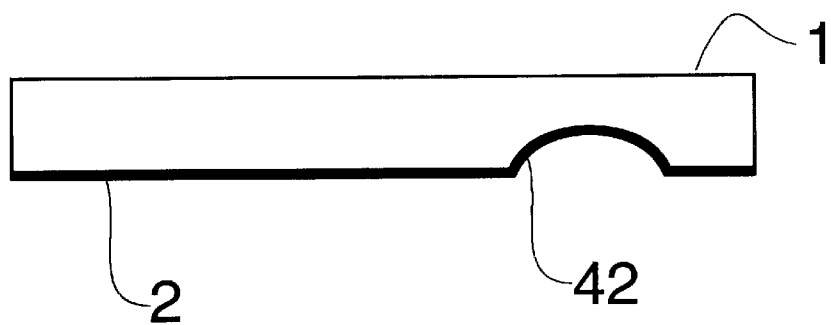
FIG. 10 shows a flat mirror with an insert convex portion to serve as both a socket recess and wide-angle mirror.
Figure 11:
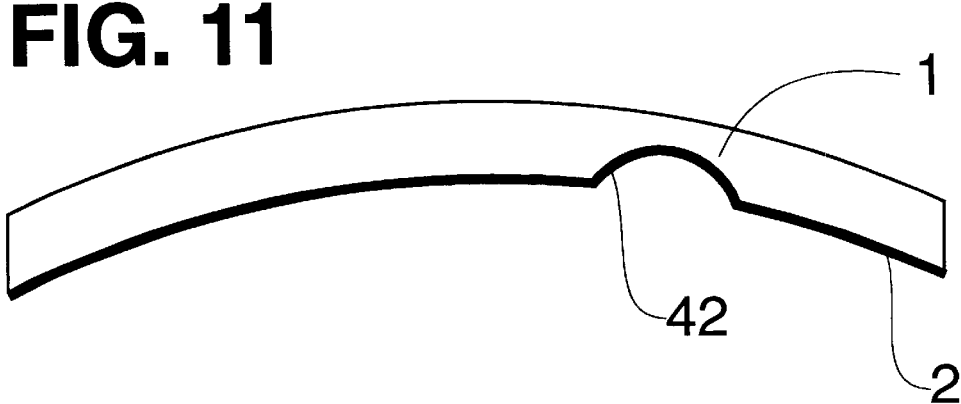
FIG. 11 shows a convex mirror with insert region which is more convex than the rest of the mirror to serve as a socket recess and wide-angle mirror.
Figure 12:
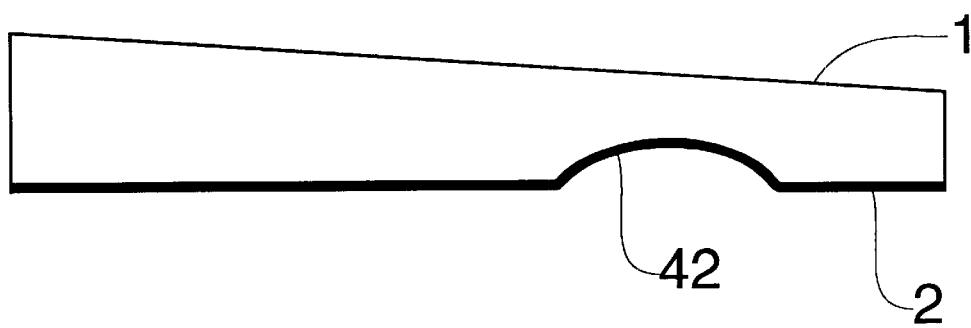
FIG. 12 illustrates a wedge mirror with an inset convex portion to serve as a socket recess and wide-angle mirror.
Figure 13:
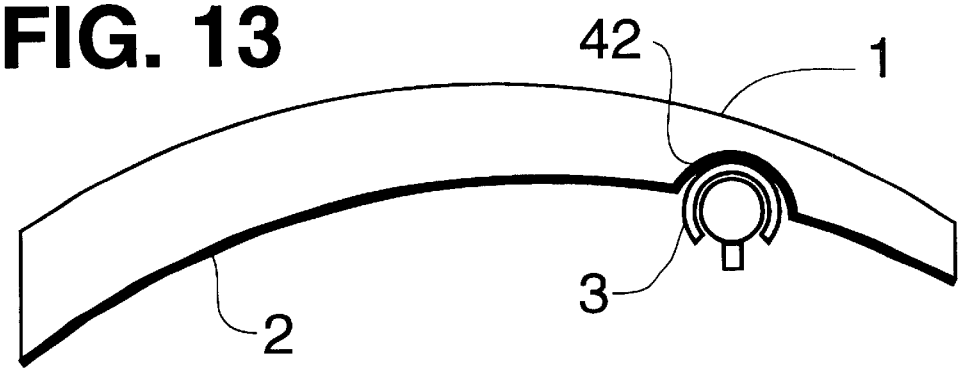
FIG. 13 illustrates a convex wedge mirror with an inset region which is more convex. Note the wedge shape of the mirror provides a wedge shape to the additional convex area as well as a wedge shape to the entire mirror. Also shown is the use of the inset as recess for a ball and socket mount.

It is possible to use any wedge mirror, either flat or convex, in any of these embodiments to provide day/night reflectivity adjustment. For the right-side rear-view mirror the solution we provide utilizes a 'wedge convex' mirror 1, as shown in FIG. 9. All aspects of the day/night adjustment work in the same way for the convex mirror as for the flat wedge mirror described in prior art. As described in the referenced prior art (U.S. Pat. 5,450,246), in the high-reflectivity day position the ray 40 entering the driver's eyes comes directly from a single reflection from the silvered surface 2. In low-reflectivity night position, the ray 41 is attenuated by a lossy reflection n3 from the unsilvered front surface of the mirror. The standard flat mirror of FIG. 10, with a convex insert 42 for increased field of view, and the convex mirror of FIG. 11, with convex insert 42 are replaced by wedge versions of the same mirrors illustrated in FIGS. 12 and 13. Note that the wedge provided for in the main mirror automatically provides an appropriate wedge for the inset region. The convex insert 42 may also be used as a mounting location for the ball pivot 3 portrayed in FIG. 13. The basic operation of the single motor directional view adjustment is the same whichever type of mirror is used.

Figure 14:
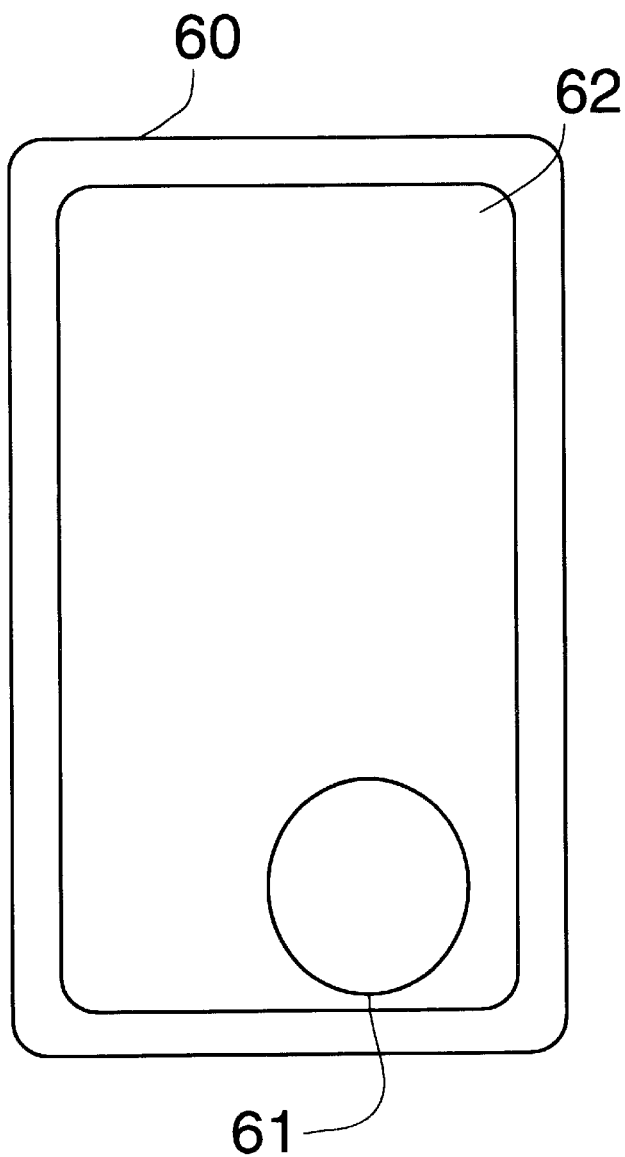
FIG. 14 shows a wedge mirror with an additional wide angle convex mirror attached.
Figure 15:
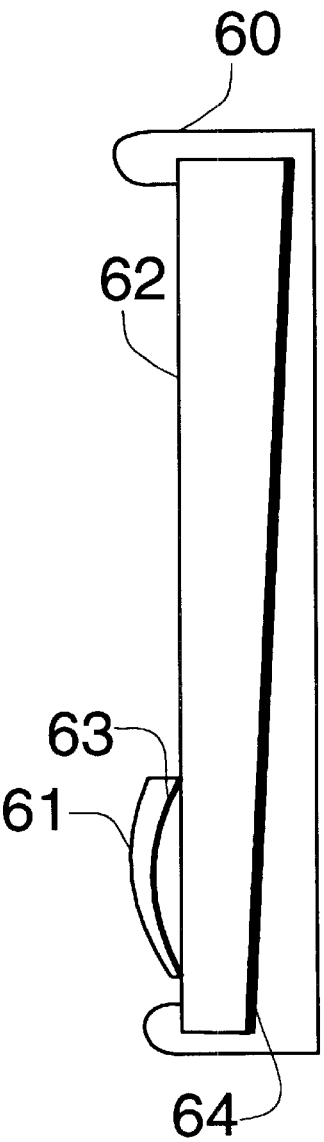
FIG. 15 shows a cutaway side-view of the wedge mirror in FIG. 14 showing the details of the mirrors.

Some drivers enhance their right-hand and left-hand mirrors with a convex mirror 61 affixed to the corner of a flat mirror 62, as shown in FIG. 14. These mirrors, usually used on large vehicles, give the driver a wide angle rear-view in addition to the standard view presented from the flat mirror. To make these mirrors day-night, one may simply make both mirrors wedges. The convex mirror will appear to be "chopped off" at one end. This can be clearly seen in FIG. 15, the side cut-away view of the mirror of FIG. 14. This configuration retains the advantages of the wide-angle convex mirror while adding the day/night functionality. These mirrors can be controlled with a single motor to present both view and reflectivity positions to the vehicle driver.

In either of these embodiments there is only one moving actuator to accomplish the mirror positioning, the motor 9 or 20. One active device is used to accomplish both the multi-axis directional alignment (the view-positioning adjustment) and the day/night reflectivity adjustment. This greatly reduces the possible failure modes, since there are fewer active components, and also serves to reduce cost.

While the invention has been detailed in explanations of the embodiments and illustrated in the figures it will be clear to those skilled in the art that the modifications described as alternatives, may be pursued without departing from the spirit and scope of the invention, as defined in the following claims.

What is claimed is:

1. A vehicle rear-view mirror control system for a vehicle having at least one rear-view wedge mirror having a characteristic attenuation which is a function of tilt characterized by means to identify a given vehicle driver;

means to store and recall a set of specific day/night wedge-mirror settings defining a directional alignment for day and a directional alignment for night having the same view attenuated for glare;

means to store and recall a glare threshold for a given vehicle driver;

a plurality of light sensors to determine ambient light and light entering said at least one rear-view wedge mirror to provide light readings; and means responsive to said means to store and recall a glare threshold for a given vehicle driver to automatically move said at least one rear-view wedge mirror between day and night directional alignments having the same view with differing glare attenuation, when said light readings cross said glare threshold.

2. A vehicle rear-view mirror control system having plural individual mirrors which are individually controllable for directional alignment and have at least two different reflectivities related to directional alignment characterized by control means for a selected individual mirror to be toggled from one reflectivity mode to another by change to a reflectivity-related different directional alignment; and means to override said control system to prevent a selected mirror from changing its reflectivity mode.

3. A vehicle rear-view mirror control system characterized by means to identify a given vehicle driver;

means to store and recall a repertoire of specific day and night wedge-mirror settings defining a day directional alignment and a night directional alignment for said at least two of said individual mirrors, the night directional alignments being different from the day directional alignments, showing the same views attenuated for glare;

means to store and recall the vehicle driver's specific glare thresholds for each of said at least two of said individual mirrors;

a plurality of light sensors to determine ambient light and light entering at least one of said individual mirrors to provide light readings; and means to automatically toggle each of said at least two individual mirrors between day and night positions when said light readings cross said glare thresholds as adjusted for said specific reflectivity day and night wedge-mirror settings.

* * * * *